Oct. 6, 1970  R. J. SNEEDEN  3,531,937

FUEL VAPORIZER FOR GAS TURBINE ENGINES

Filed Sept. 24, 1968

INVENTOR.
RALPH J. SNEEDEN
BY Raymond P. Wallace

AGENT

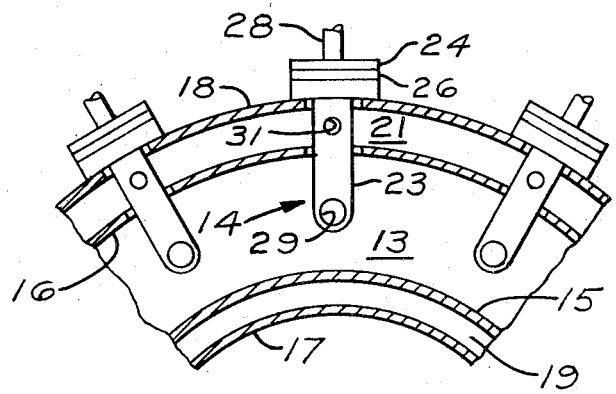
FIG. 3
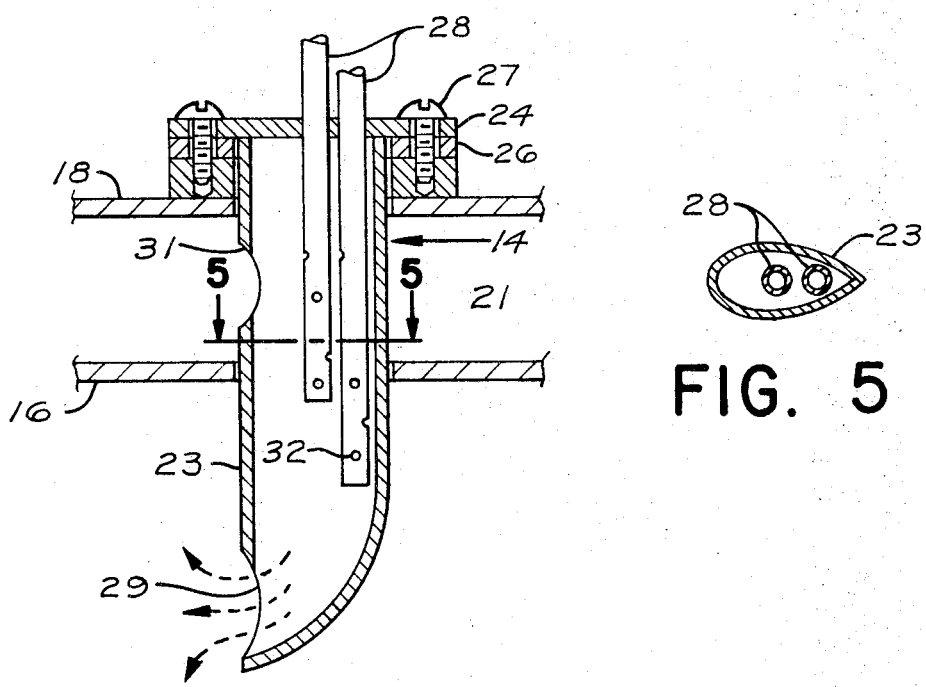
FIG. 4
FIG. 5

United States Patent Office 3,531,937
Patented Oct. 6, 1970

3,531,937
FUEL VAPORIZER FOR GAS TURBINE ENGINES
Ralph J. Sneeden, Boxford, Mass., assignor to Curtiss-Wright Corporation, a corporation of Delaware
Filed Sept. 24, 1968, Ser. No. 762,055
Int. Cl. F02c 3/22
U.S. Cl. 60—39.71                                1 Claim

ABSTRACT OF THE DISCLOSURE

A fuel vaporizer assembly projecting into the combustion chamber of a gas turbine engine, and adjustable or removable therefrom without disassembly of the engine.

BACKGROUND OF THE INVENTION

This invention pertains to the field of gas turbine engines, and more particularly to a device for introducing vaporized fuel into the air entering the combustion chamber of such an engine.

The conventional method of feeding fuel into the combustion chamber of gas turbine engines is by means of atomizing spray nozzles which discharge directly into the combustion zone, or by means of vaporizing J-tubes such as that shown in U.S. Pat. No. 2,841,958. The J-tube projects into the flame zone in an axial direction and is recurved so that its orifice discharges in an upstream direction against the inflow of air. Liquid fuel is fed into its entrance end, vaporizes within the tube on the hot wall, and is discharged as gas for combustion with the air. In the case of either the spray nozzles or vaporizing tubes, they are commonly mounted on a headplate which extends across the upstream end of the combustion chamber, and they cannot be demounted without disassembling the engine. Further, in such an assembly their length and positioning are fixed and not subject to adjustment. Such lack of accessibility and adjustability render it cumbersome and expensive to make any changes during development or tuning of an engine, since new parts must be provided and the necessary work is time-consuming.

SUMMARY

This invention provides a vaporizer assembly which is mounted externally on the peripheral wall of the combustion chamber and projects inwardly therethrough. The assembly is demountable from the exterior of the engine, and the depth of projection into the combustion chamber can be controlled at the mounting. Further, the fuel tubes feeding the vaporizer tube can be adjusted to discharge at selected depths within the vaporizer tube for better vaporization.

It is therefore an object of the invention to provide fuel feed means for a gas turbine engine which is demountable without disassembly of the engine.

It is a further object to provide fuel feed means which is readily adjustable for tuning an engine.

A still further object is to provide a fuel vaporizer in which the fuel feed tubes are adjustable to selected depths.

Other objects and advantages will be apparent on reading the following specification in conjunction with the appended drawings.

BRIEF DESCRIPTION OF THE DRAWINGS

FIG. 3 is a fragmentary cross-section taken on line 3—3 of FIG. 2;

FIG. 4 is a cross-sectional elevation of the fuel feed means; and

FIG. 5 is a cross-section taken on line 5—5 of FIG. 4.

DESCRIPTION OF THE PREFERRED EMBODIMENTS

Figure 1:
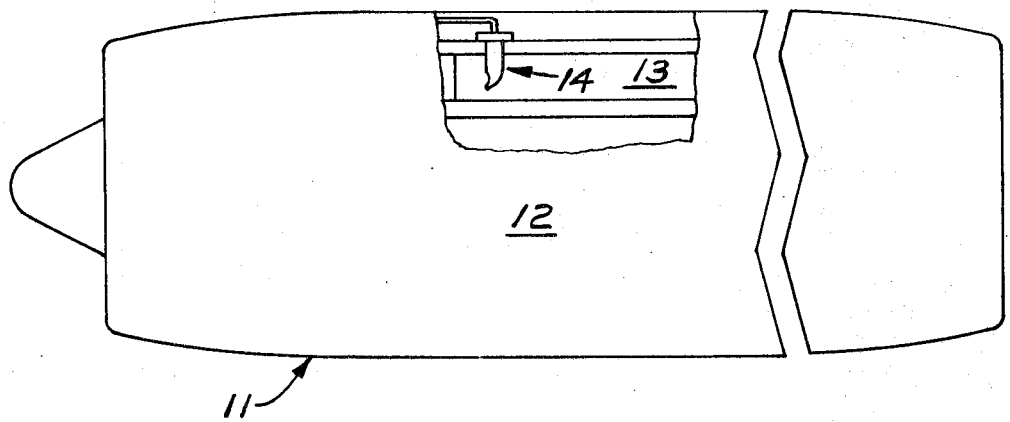
FIG. 1 is an external view of a jet engine partially cut away to show the general positioning of the fuel feed means.

In FIG. 1 there is shown an external view of a jet engine 11 having a cowling 12 partially cut away to show a portion of an annular combustion chamber 13 having the fuel feed assembly 14 installed therein. The fuel feed means of this invention may equally well be used in combustion chambers of the cannular type, or cylindrical combustion chambers.

Figure 2:
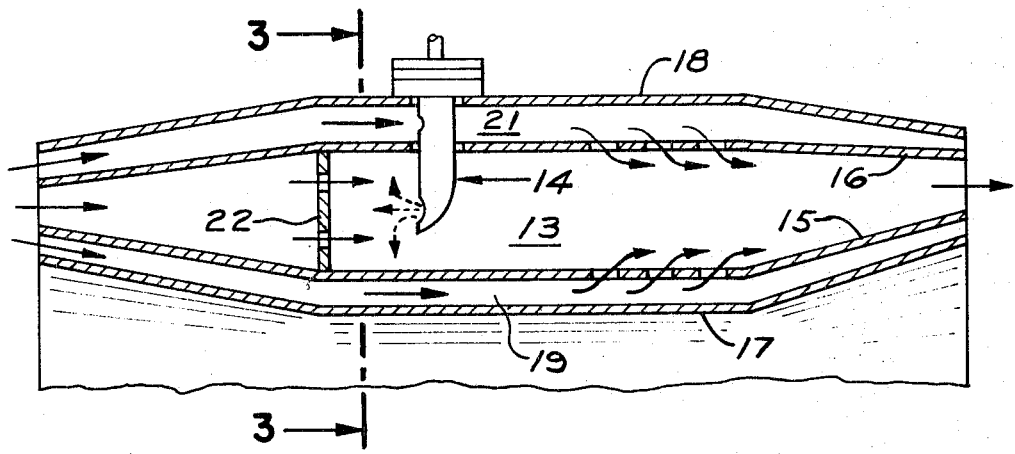
FIG. 2 is a fragmentary view of a cross-sectional elevation of a portion of a jet engine combustion chamber.

FIG. 2 shows annular walls 15 and 16 defining the combustion chamber 13, surrounded by inner and outer walls 17 and 18 defining inner duct 19 and outer duct 21 surrounding the combustion chamber. The combustion chamber and the surrounding ducts receive air at the upstream end from the compressor, as indicated by the arrows. The combustion chamber is provided with an apertured headplate 22 toward its upstream end, through which a portion of the air for combustion passes. Additional air for combustion and for cooling the combustion gases enters the combustion chamber further downstream, either by providing apertures through walls 15 and 16 of the chamber as shown, or by providing a chamber of multipart construction as shown in U.S. Pat. No. 3,244,194, having other means for entry of diluent air.

Just downstream from the headplate 22 there is provided a plurality of fuel feed means 14 (best shown in FIGS. 3 and 4) externally mounted on wall 18 and projecting generaly radially inwardly therethrough and into the combustion chamber 13 through its outer wall 16.

Each fuel feed means has a vaporizing tube 23 of approximately streamlined or ovoid cross section extending through apertures in walls 18 and 16 into the combustion chamber. The outer end of the vaporizer tube has a closure flange 24 attached thereto, and a washer-like spacer element 26 surrounding the tube under the flange. Spacer 26 may be of any desired thickness, and is readily removable and replaceable by spacers of different thickness when it is desired to vary the depth of penetration of the vaporizer into the combustion chamber. The whole assembly is securely mounted on wall 18, as by bolts 27 passing through the flange and spacer, or by other convenient means.

One or more fuel tubes 28 connected to a fuel tank (not shown) pass through apertures in closure flange 24, being retained therein by friction, brazing, locknuts, or other convenient means. The fuel tubes 28 project into the interior of vaporizer tubes 23 to a desired depth, and if more than one fuel tube is used in each vaporizing tube their open inward ends may be at different depths. The portions of the fuel tubes 28 which extend within the vaporizer tubes are straight for easy depth adjustment or removal through the apertures in the closure flange.

The upstream wall of the vaporizer tube has an orifice 29 at the radially inward end of the tube, the downstream wall at that end being curved in the upstream direction to form a closure of the inward end of the tube. A further aperture 31 is provided in the upstream wall of the vaporizer tube in that portion which passes through air duct 21. In operation liquid fuel is delivered through the open ends of fuel tubes 28 at a rate governed by the throttle setting. Air entering aperture 31 from air duct 21 causes turbulence within the vaporizer tube, and the fuel is deposited on the interior of the wall of the vaporizer tube. Since the vaporizer tube extends into the flame zone of the combustion chamber, the fuel is vaporized by the heat of combustion and is discharged through orifice 29 into the combustion chamber, where it mixes with air entering through the apertured headplate 22 for continued combustion. If desired, the fuel tubes 28 may have apertures 32 through that portion of their walls which is contained within the vaporizer tube, to aid in distribution of the fuel charge onto the hot wall of the vaporizer tube.

The cowling 12 of a jet engine is readily removable, or access plates may be provided for exposing the mountings of the fuel feed means. It will thus be apparent that this invention provides fuel feed means which is readily demountable or adjustable without disassembly of the engine. Although the invention has been described in a preferred embodiment, various changes and modifications may be made by those skilled in the art without departing from the scope of the invention. It is intended to cover all such modifications by the appended claim.

What is claimed is:

1. A jet engine having an axial-flow annular combustion chamber defined by inner and outer coaxial walls, the combustion chamber being surrounded by an annular air duct defined by the outer combustion chamber wall and a third wall outwardly spaced therefrom and coaxial therewith, the combustion chamber and the air duct having upstream and downstream ends, and means for supplying air to the upstream ends of the duct and the combustion chamber, wherein the improvement comprises the combination with said engine of a plurality of fuel feed means readily demountable and radially adjustable for tuning the engine, each fuel feed means comprising.

(a) a vaporizer tube of approximately streamlined cross-section extending radially inward through the air duct and into the combustion chamber to a variable depth, (b) the vaporizer tube being removably mounted on the outer air duct wall and having a closure flange at its outer end and a removable spacer surrounding the vaporizer tube disposed between the closure flange and the outer air duct wall, the spacer being of a thickness selected for governing the inward projection of the vaporizer tube to the desired depth in the flame zone of the combustion chamber for tuning the engine, (c) at least one fuel supply tube extending through the closure flange into the vaporizer tube and having an aperture for discharge of liquid fuel into the vaporizer tube, (d) the vaporizer tube having an aperture in its upstream side positioned within the annular air duct for entry of air into the vaporizer tube, (e) the vaporizer tube having its inner end closed in the radial direction and having an orifice in the inner end portion facing in the upstream direction for discharge of vaporized fuel and air in the upstream direction into the combustion chamber.

References Cited

UNITED STATES PATENTS 2,792,058 5/1957 Thomas _____ 60—39.71
2,956,404 10/1960 Kassner _____ 60—39.71
3,086,361 4/1963 Howland _____ 60—39.71

References Cited

FOREIGN PATENTS 726,538 3/1955 Great Britain.

DOUGLAS HART, Primary Examiner

U.S. Cl. X.R.

60—39.31, 39.74.